US009227647B2

(12) United States Patent
Masaki et al.

(10) Patent No.: US 9,227,647 B2
(45) Date of Patent: Jan. 5, 2016

(54) MANUALLY PROPELLED VEHICLE

(71) Applicant: Funai Electric Co., Ltd., Osaka (JP)

(72) Inventors: Yasuo Masaki, Osaka (JP); Atsushi Kojina, Kyoto (JP); Takahiro Katayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/471,039

(22) Filed: Aug. 28, 2014

(65) Prior Publication Data
US 2015/0066275 A1    Mar. 5, 2015

(30) Foreign Application Priority Data

Aug. 30, 2013  (JP) ................................. 2013-180202

(51) Int. Cl.
| *B60L 9/00* | (2006.01) |
| *B62B 5/00* | (2006.01) |
| *B62B 5/06* | (2006.01) |
| *A61H 3/04* | (2006.01) |
| *A61H 3/00* | (2006.01) |

(52) U.S. Cl.
CPC ................ *B62B 5/0073* (2013.01); *A61H 3/04* (2013.01); *B62B 5/0033* (2013.01); *B62B 5/0069* (2013.01); *B62B 5/06* (2013.01); *A61H 2003/002* (2013.01); *A61H 2003/043* (2013.01); *A61H 2201/0176* (2013.01); *A61H 2201/168* (2013.01); *A61H 2201/1633* (2013.01); *A61H 2201/1635* (2013.01); *A61H 2201/5028* (2013.01); *A61H 2201/5061* (2013.01); *A61H 2201/5064* (2013.01); *A61H 2201/5069* (2013.01)

(58) Field of Classification Search
CPC ........ A61H 3/04; A61H 3/043; B62B 5/0026; B62B 5/0033; B62B 5/0073
See application file for complete search history.

(56) References Cited

U.S. PATENT DOCUMENTS

| 5,746,282 A | 5/1998 | Fujiwara et al. | |
| 2011/0166753 A1* | 7/2011 | Yu et al. ......................... | 701/51 |
| 2012/0029696 A1* | 2/2012 | Ota et al. ...................... | 700/250 |

FOREIGN PATENT DOCUMENTS

| DE | 19614411 A1 | 10/1996 |
| DE | 202011104720 U1 | 11/2011 |
| DE | 102011080056 A1 | 1/2013 |
| DE | 202012011634 U1 | 2/2013 |
| DE | 102011084236 A1 | 4/2013 |
| JP | 4119149 B2 | 7/2008 |

OTHER PUBLICATIONS

Extended European Search Report issued in corresponding European Application No. 14182898.8, mailed Feb. 19, 2015 (7 pages).

* cited by examiner

*Primary Examiner* — Michael D Lang
(74) *Attorney, Agent, or Firm* — Osha Liang LLP

(57) ABSTRACT

A manually propelled vehicle includes a vehicle body; a wheel for moving the vehicle body; a force sensor that detects an operating force and outputs sensor data; a distance measuring sensor that measures a distance between the manually propelled vehicle and a user and outputs sensor data; and a controller including a processor that receives the sensor data of the force sensor and the sensor data of the distance measuring sensor and a wheel drive controller that controls driving and braking of the wheel based on an output of the processor.

18 Claims, 15 Drawing Sheets

MANUALLY PROPELLED VEHICLE

FIELD OF THE INVENTION

The present invention relates generally to a manually propelled vehicle (e.g., ambulatory assist vehicles, baby carriages, dollies, wheelchairs, and the like).

RELATED ART

Manually propelled vehicles (e.g., ambulatory assist vehicles to support independent walking for people with physical handicaps and elderly people who cannot continuously walk safely and independently) may have human-power assist functions (so-called electromotor assist functions).

For example, in Patent Document 1, an ambulatory assist vehicle comprising a movable base body, a motion control mechanism that controls the movement of the base body, and a support part provided on the base body that supports a user, is disclosed. Further, in the ambulatory assist vehicle, a force sensor that detects an operating force acting on the support part from the user is provided, and the motion control mechanism is controlled according to a force detected value detected by the force sensor.

DOCUMENTS OF THE RELATED ART

Patent Document

[Patent Document 1] Japanese Patent Publication No. 4119149

However, although the conventional technology of Patent Document 1 described above is effective when walking in a steady state, it is not necessarily effective in unexpected situations. For example, the ambulatory assist vehicle moves forward by detecting a force by the force sensor even if the legs of the user supported by the support part cannot keep up with an ambulatory assist vehicle, so there may be a risk of the user falling forward.

SUMMARY OF THE INVENTION

One or more embodiments of the present invention provide a manually propelled vehicle that realizes appropriate operation that reflects a condition and intent of a user.

According to one or more embodiments, a manually propelled vehicle may comprise: a vehicle body; a wheel for moving the vehicle body; a force sensor that detects an operating force and outputs sensor data; a distance measuring sensor that measures a distance between the manually propelled vehicle and the user and outputs sensor data; and a controller comprising: a processor that receives the sensor data of the force sensor and the sensor data of the distance measuring sensor; and a wheel drive controller that controls driving and braking of the wheel based on an output of the processor. Such configuration, for example, can perform driving and controlling that reflects an intent or condition of the user.

According to one or more embodiments, the processor may determine that an abnormal condition has occurred when the processor detects a deviation from a standard state of use based on at least one of the sensor data of the force sensor and the sensor data of the distance measuring sensor. According to such configuration, for example, the processor can detect an abnormal condition of the user and perform driving and controlling corresponding on that.

According to one or more embodiments, when the processor detects the deviation from the standard state by determining that the measured distance by the distance measuring sensor exceeds a predetermined distance, the wheel drive controller may brake or stop the manually propelled vehicle. According to such configuration, for example, the manually propelled vehicle is either braked or stopped when the foot of the user cannot continue to follow the manually propelled vehicle and the user becomes nearly falling forward. Therefore, for example, the manually propelled vehicle may prevent the user from falling.

According to one or more embodiments, the processor may set a standard state for each pattern of use (normal use without deviation) by calculating statistics based on the sensor data of the force sensor and the sensor data of the distance measuring sensor. According to such configuration, for example, the processor may learn and comprehend the standard states according to a tendency of individual usage by a user.

According to one or more embodiments, the processor may determine a gait cycle of the user based on sensor data of the force sensor and the sensor data of the distance measuring sensor, and the wheel drive controller may control the driving and braking of the wheel based on the gait cycle. According to such configuration, for example, the processor may perform driving and controlling according to an analysis result based on rhythmicity by a gait of a user.

According to one or more embodiments, the processor may exclude data variation cycles that are shorter than a data variation cycle synchronized with the gait cycle. According to such configuration, for example, the processor may exclude influences, for example, such as rattling on the road where the manually propelled vehicle travels or the like.

According to one or more embodiments, the manually propelled vehicle may further comprise a grip to be held by the user and attached to the vehicle body, wherein the force sensor may comprise: a right hand grip sensor provided on a right hand of the grip and that detects pressure applied on the grip by a right hand of the user; and a left hand grip sensor provided on a left hand of the grip and that detects pressure applied on the grip by a left hand of the user, and the sensor data of the force sensor may comprise the pressure detected by the right hand grip sensor and the pressure detected by the left hand grip sensor. According to such configuration, for example, even when a user operates by gripping a handle by one hand, an appropriate driving and controlling that reflects operation intent of a user may be performed.

According to one or more embodiments, when the processor determines that the grip is held by the user with one of either the right or the left hand, the processor may determine whether the detected pressure of the one of the grip sensors is equal to or less than a predetermined value, whether the grip is pushed or pulled by the user based on the sensor data of the force sensor, and whether the measured distance by the distance measuring sensor tends to be short or long, and based on a determination result of the processor, the wheel drive controller may control the manually propelled vehicle to accelerate or decelerate and to move forward, backward, or turn. According to such configuration, for example, even when an operating force applied onto the grip is extremely weak by a user, for example, an elderly person, an appropriate driving and controlling that reflects operation intent of a user may be performed.

According to one or more embodiments, the processor may determine whether the grip is pushed or pulled by user based on the sensor data of the force sensor, whether a difference in detected values between the left and the right grip sensors is equal to or less than a predetermined value, and whether the measured distance by the distance measuring sensor tends to be short or long, and based on a determination result of the processor, the wheel drive controller may control the manually propelled vehicle to accelerate or decelerate and to move forward, backward, or turn. According to such configuration, for example, assist control may be initiated after confirming the state of normal use of the user.

According to one or more embodiments, a method for controlling a manually propelled vehicle comprising a vehicle body and a wheel for moving the vehicle body may comprise: detecting an operation of the manually propelled vehicle by a user and outputting sensor data based on the detecting; measuring a distance between the manually propelled vehicle and the user and outputting sensor data based on the measuring; controlling driving and braking of the wheel based on the sensor data of the detecting and the sensor data of the measuring.

A manually propelled vehicle one or more embodiments of the present invention can provide appropriate operation that reflects a condition and intent of a user can be realized.

DETAILED DESCRIPTION OF EMBODIMENTS OF THE INVENTION

First Example

Figure 1:
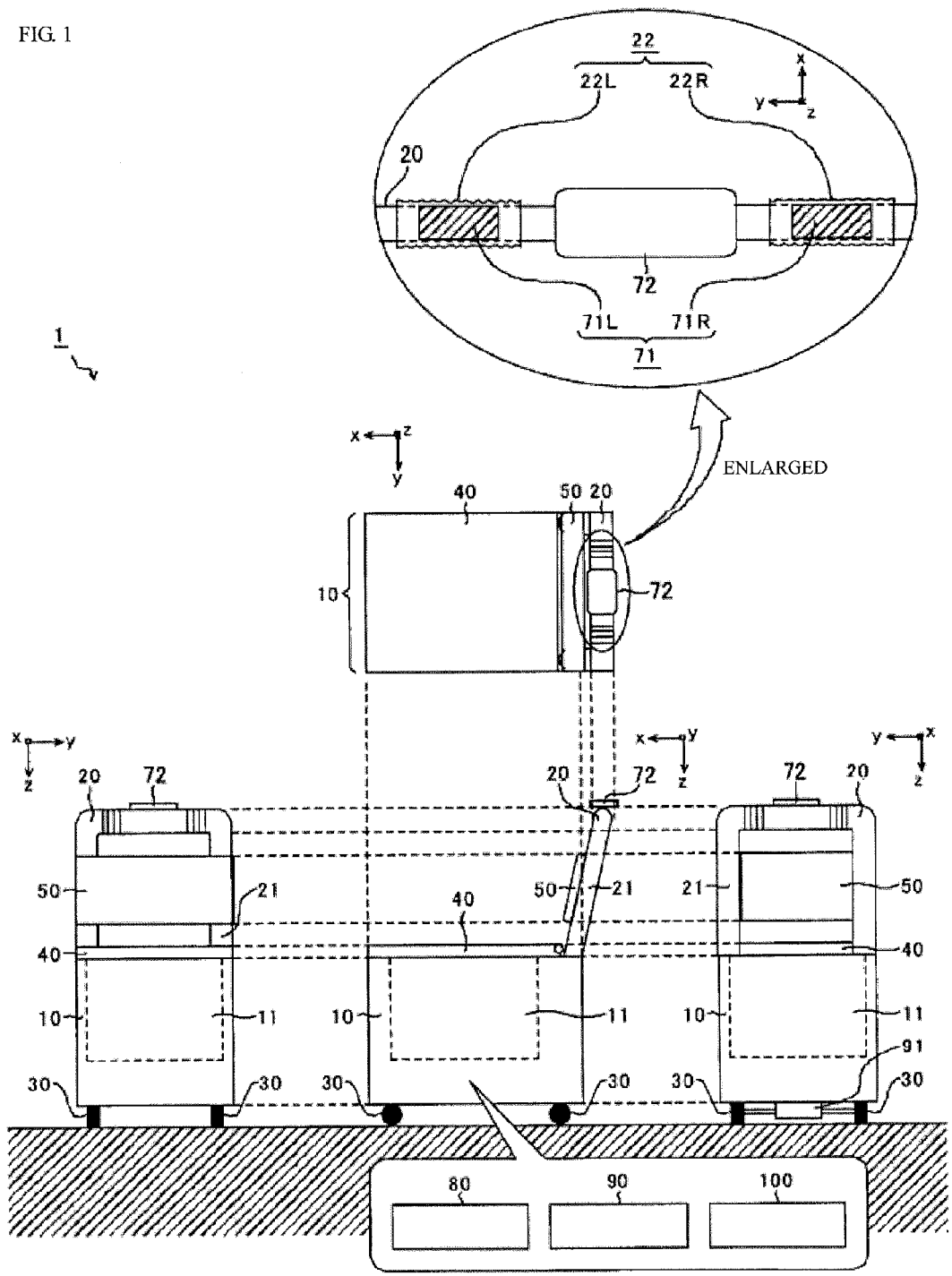
FIG. 1 may be an external view illustrating a manually propelled vehicle according to one or more embodiments of a first example of the present invention.
Figure 2:
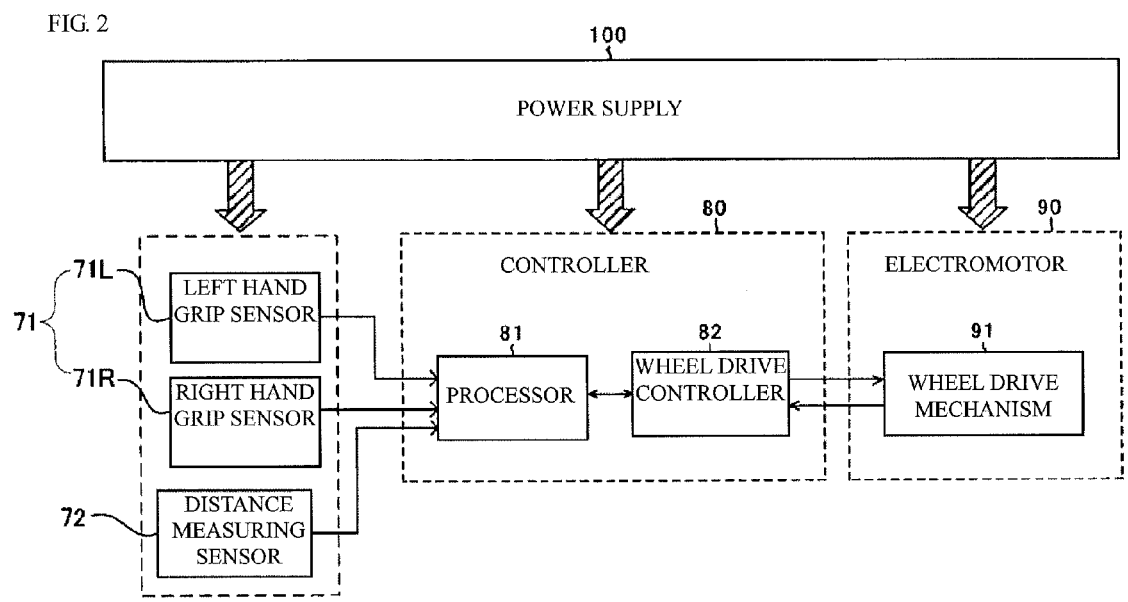
FIG. 2 may be a functional block diagram illustrating the manually propelled vehicle according to one or more embodiments of the first example of the present invention.

A description of embodiments according to the present invention will be described with reference to drawings. FIG. 1 and FIG. 2 respectively illustrate an external view and a functional block diagram of a manually propelled vehicle 1 according to one or more embodiments of the first example. The lower part of FIG. 1 schematically illustrates in order from left to right on the sheet, an anterior view (front view), a left side view, and a posterior view (rear view) of the manually propelled vehicle 1, and the middle center part of FIG. 1 illustrates a top view of the manually propelled vehicle 1. Further, the upper part of FIG. 1 schematically illustrates an enlarged view of the handle.

The manually propelled vehicle 1 assists walking of a user and may be, for example, a so-called walker for an elderly person, and may also be used as a basket for load carriage and a chair for resting. The manually propelled vehicle 1 may comprise a vehicle body 10, a grip 20, a wheel 30, a seat 40, a backrest 50, a grip sensor 71, a distance measuring sensor 72, a controller 80, an electromotor 90, and a power supply 100.

The vehicle body 10 may be a chassis (frame) of the manually propelled vehicle 1 on which the configuration elements 20 to 100 listed above may be mounted. Further, a space as a baggage compartment 11 may be provided inside (lower part of the seat 40) the vehicle body 10. Stainless steel, aluminum alloy, or the like may be used for the frame material forming the vehicle body 10.

The grip 20 may be a member where the user grips at the time of walking and may be connected to the vehicle body 10 via a support part 21. The user can move the manually propelled vehicle 1 forward, backward, braking, and turning by applying human power by gripping the grip 20 with both hands or with one hand. In addition, the grip 20 may comprise a slip resistant grip 22 (left hand grip 22L and right hand grip 22R).

Figure 3:
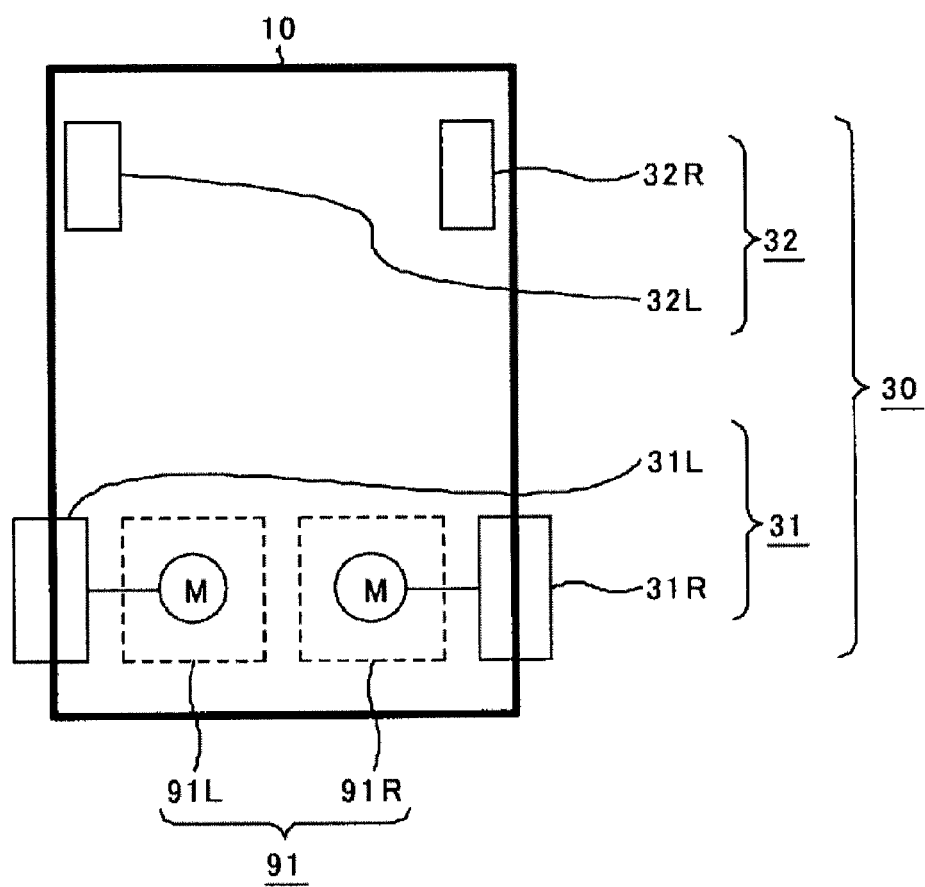
FIG. 3 may be a schematic diagram illustrating an example of one configuration of a wheel and a wheel drive mechanism according to one or more embodiments.

The wheel 30 may be an annular member to move the vehicle body 10 along the ground by rotating in harmony with the walking of the user. As illustrated in FIG. 3, the wheel 30 may be a four-wheel structure comprising drive wheels 31 (left and right drive wheels 31L and 31R) that are rotated at the axle center by human power (or auxiliary power) and idler wheels 32 (left and right idler wheels 32L and 32R) for turning direction. The left and right drive wheels 31L and 31R may be driven and controlled independently for the rotation speed and rotation direction by respectively corresponding wheel drive mechanisms 91L and 91R.

The seat 40 may be a plate-like member for the user to sit down on when seated. Further, the seat 40 may also function as an upper lid of the baggage compartment 11 and may be attached so as to enable the upper opening part of the baggage compartment 11 to open and close.

The backrest 50 may be a plate-like member for the user to lean back on when seated. The backrest 50 may be a plate-like member for the user to lean back on when seated. In addition, the backrest 50 may be attached to the support part 21 or integrally provided with the vehicle body 10.

The grip sensor 71 (force sensor) may detect a user's operating force on the manually propelled vehicle 1 from the user, and may include the left hand grip sensor 71L provided in the left hand grip 22L and the right hand grip sensor 71R provided in the right hand grip 22R. The left hand grip sensor 71L and the right hand grip sensor 71R may detect a distribution of applied pressure.

The distance measuring sensor 72 may be provided in a position between the left and right grips 22L and 22R in the grip 20 and may measure a distance between the manually propelled vehicle 1 and the user positioned behind the manually propelled vehicle 1. The distance measuring sensor 72 can be adopted without being particularly limited to a method such as an ultrasonic sensor, an infrared sensor, or the like.

The controller 80 may be a logic circuit (such as a microcomputer) that comprehensively controls the grip sensor 71, the distance measuring sensor 72, and the electromotor 90. For example, the controller 80 may include a processor 81 and a wheel drive controller 82 as functional blocks to realize an operation according to an intent and condition of the user by setting a variety of parameters (rotation direction of the motor, rotation speed target value, and the like) of the wheel drive mechanism 91 according to the output of the grip sensor 71 and the distance measuring sensor 72. The processor 81 (e.g., data analyzer) may analyze the sensor data of the grip sensor 71 and the distance measuring sensor 72. The wheel drive controller 82 may control the rotation direction and the rotation speed of the left and right drive wheels 32L and 32R according to and output by the processor 81. A description of the various functions of the controller 80 will be given later.

The electromotor 90 may drive each component of the manually propelled vehicle 1 electromotively according to instructions from the controller 80 and may include the wheel drive mechanism 91 that drives the wheel 30 electrically according to the instructions from the controller 80. For example, the left and right wheel drive mechanisms 91L and 91R may be used individually (see FIG. 3 mentioned above) to respectively control the left and right drive wheels 31L and 31R, independently.

The power supply 100 may supply electric power to the grip sensor 71, distance measuring sensor 72, controller 80, and the electromotor 90. A secondary battery (such as a nickel-hydrogen battery or lithium-ion battery) attaching to the vehicle body 10 in a removable manner may be used for the power supply 100.

Figure 4:
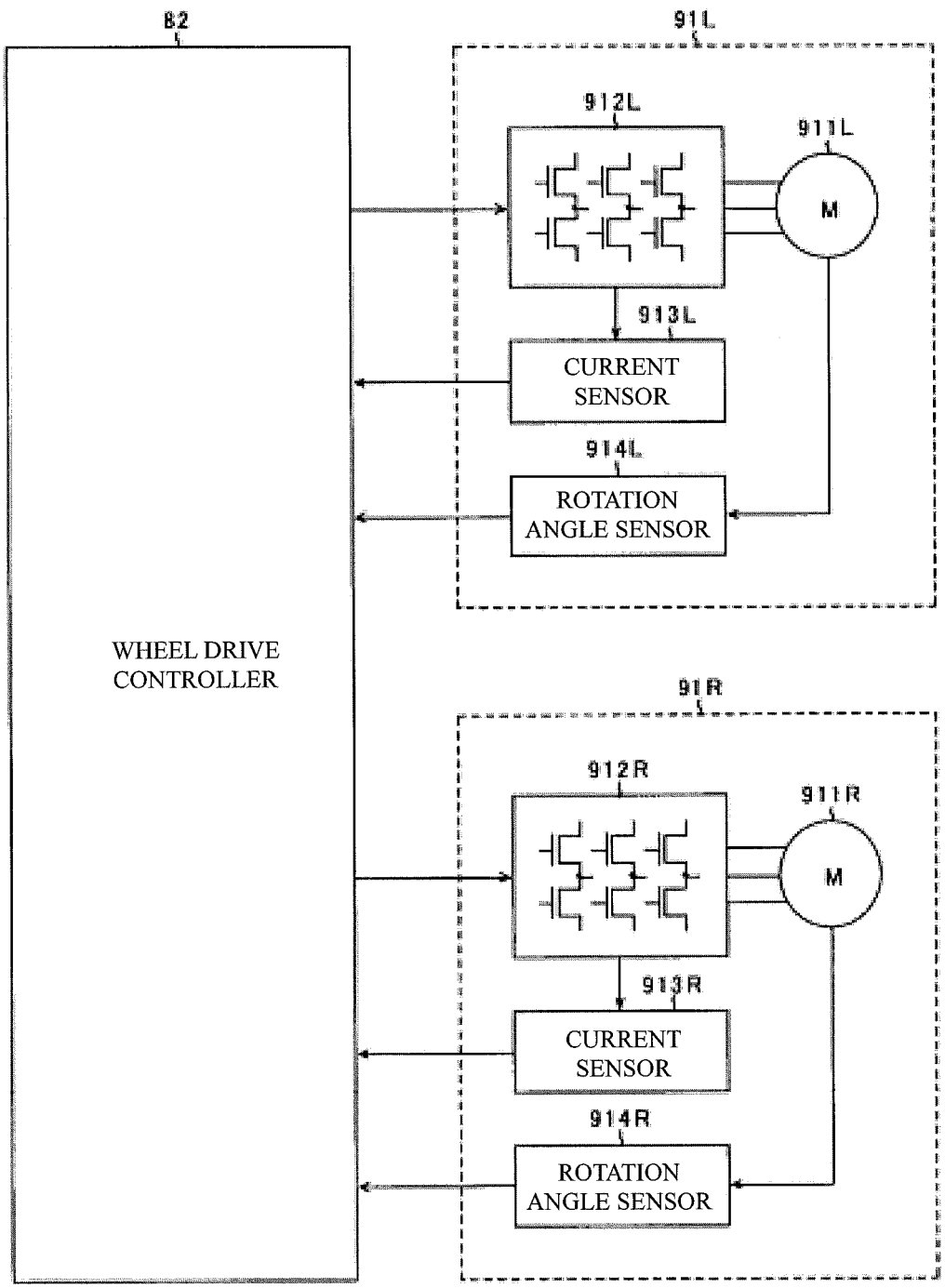
FIG. 4 may be a functional block diagram illustrating an example of one configuration of the wheel drive mechanism according to one or more embodiments.

FIG. 4 may be a functional block diagram illustrating an example of one configuration of the wheel drive mechanisms 91L and 91R. The wheel drive mechanisms 91L and 91R may include motors 911L and 911R, motor drivers 912L and 912R, current sensors 913L and 913R, and rotation angle sensors 914L and 914R, respectively.

Each of the motors 911R and 911L may independently rotate and drive the left and right drive wheels 31L and 31R. Each of the motor drives 912L and 912R may be an inverter circuit for generating a drive current for the motors 911L and 911R according to a control signal from the controller 80. Each of the current sensors 913L and 913R may detect the drive current supplied to the motors 911L and 911R. Each of the rotation angle sensors 914L and 914R may detect a rotation angle of the motors 911L and 911R. The wheel drive controller 82 may carry out feedback control of the motor drivers 912L and 912R so as to match the rotation direction and rotation speed of the motors 911L and 911R to a target value according to each output of the current sensors 913L, 913R and the rotation angle sensors 914L, 914R.

Figure 5:
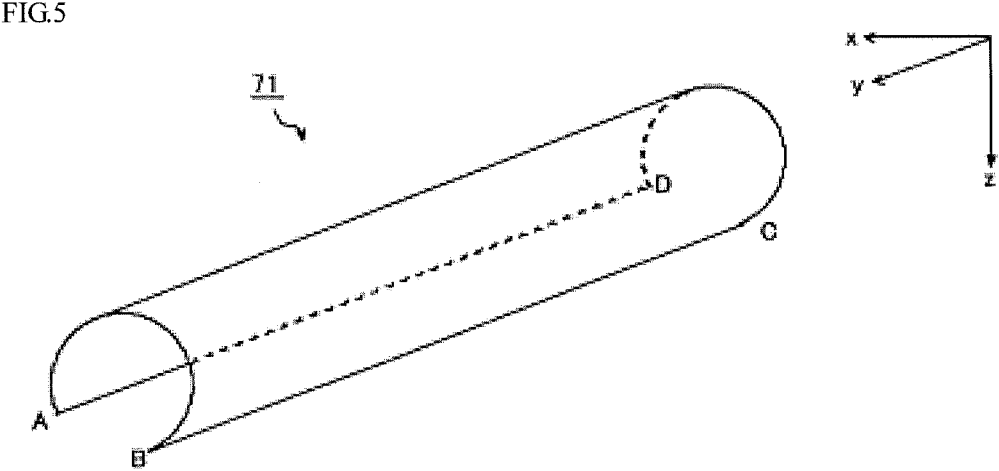
FIG. 5 may be a perspective view illustrating an example of one configuration of a grip sensor according to one or more embodiments.
Figure 6:
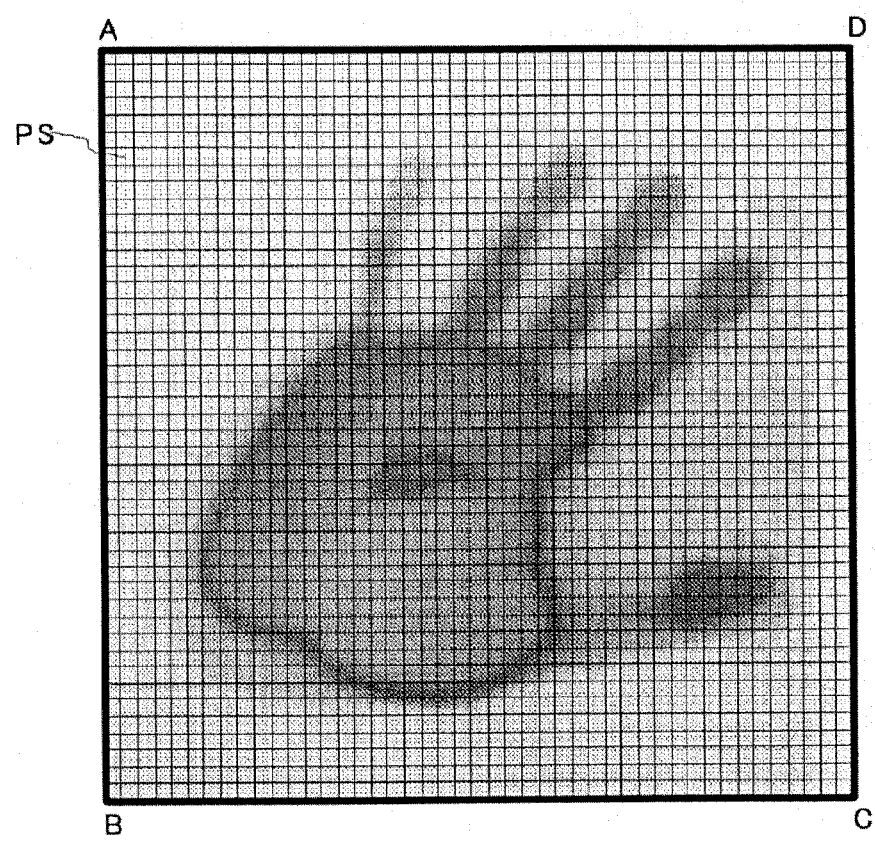
FIG. 6 may be a plan exploded view illustrating an example of one configuration of the grip sensor according to one or more embodiments.

FIG. 5 and FIG. 6 are, respectively, a perspective view and a plan exploded view illustrating an example of one configuration of the grip sensor 71 (the left hand grip sensor 71L or the right hand grip sensor 71R), and the reference codes A to D correspond to four corners of the grip sensor 71 illustrated in both drawings. The grip sensor 71 may be a sheet-like member where a plurality of pressure sensors PS may be arranged in a matrix and used by winding around the grip 20. The plurality of pressure sensors PS may output an electric signal in which the signal level (for example, a voltage value) fluctuates according to the amount of pressure applied to each. Accordingly, when the user is holding the grip 20, a distribution of pressure according to the gripping conditions may be detected by the grip sensor 71.

Figure 7:
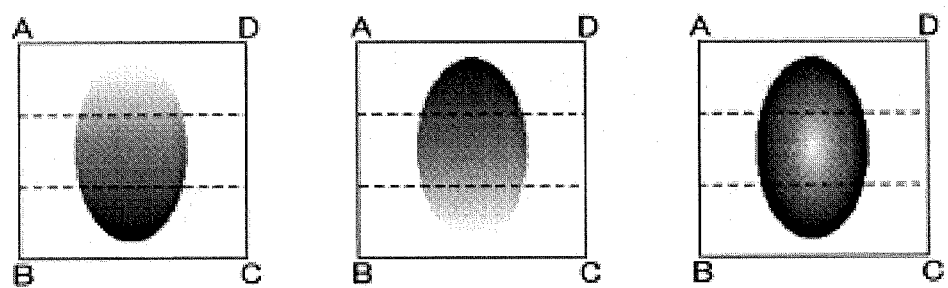
FIG. 7 may be an illustration of an example of a pressure distribution when the grip sensor is held according to one or more embodiments.

FIG. 7 may be a drawing illustrating one example of a pressure distribution when gripping the grip sensor 71 and is expressed such that the black portions become darker as the pressure is stronger. For example, when the user pushes on the grip 71 (left end in FIG. 7) to move the manually propelled vehicle 1 forward, a thenar and a hypothenar (thicker parts near the wrist) of the palm that holds the grip 20, may contact the grip sensor 71 strongly. Therefore, the distribution condition may be such that a large pressure may be applied to the near side of the grip sensor 71 (near the BC edge side when viewed from the user).

Meanwhile, when the user pulls on the grip sensor 71 (center in FIG. 7) to move the manually propelled vehicle 1 backward, the balls of four fingers (the forefinger, middle finger, ring finger, and little finger) that hold the grip 20, may contact the grip sensor 71 strongly. Therefore, the distribution condition may be such that a large pressure may be applied to the far side of the grip sensor 71 (away from the AD edge side when viewed from the user).

Further, when the user is neither pushing nor pulling while holding the grip sensor 71 (right end in FIG. 7), the pressure may be distributed substantially uniformly over the entire surface of the grip sensor 71.

Based on the sensor data of the grip sensor 71 (force sensor), for example, the following drive control can be performed. The processor 81 may analyze output of the grip sensor 71, determine that both left and right grip sensors 71 are being pushed (e.g., left end in FIG. 7), and set a target value of the rotation speed and rotation direction of the motor in the wheel drive controller 82 so that the manually propelled vehicle 1 moves forward and accelerates. The wheel drive controller 82 may drive and control the drive wheel 31 via the wheel drive mechanism 91 based on set parameters.

Similarly, when the processor 81 analyzes output of the grip sensor 71 and determines that both left and right grip sensors 71 are being pulled (e.g., center in FIG. 7), the manually propelled vehicle 1 may be driven and controlled so as to decelerate while moving forward. Further, when the processor 81 analyzes the output of the grip sensor 71 and determines that the manually propelled vehicle 1 is neither pushed nor pulled although both left and right grip sensors 71 are being held (e.g., right end in FIG. 7), the manually propelled vehicle 1 may be driven and controlled so as to move forward at a constant speed.

Furthermore, when the processor 81 analyzes output of the grip sensor 71 and determines that both left and right grip sensors 71 are being pulled (e.g., center in FIG. 7), the manually propelled vehicle 1 may be driven and controlled so as to accelerate while moving backward. Moreover, when the processor 81 analyzes output of the grip sensor 71 and determines that both left and right grip sensors 71 are being pushed (e.g., left end in FIG. 7), the manually propelled vehicle 1 may be driven and controlled so as to decelerate while moving backward. In addition, the processor 81 analyzes the output of the grip sensor 71, and when the processor 81 may determine that the manually propelled vehicle 1 is neither pushed nor pulled although both left and right grip sensors 71 are held (e.g., right end in FIG. 7), the manually propelled vehicle 1 may be driven and controlled so as to move backward at a constant speed.

Further, there are cases where the user pushes either left or right side on the grip 20 and pulls the other grip. The left side of FIG. 8 (left side of the broken line) illustrates one example of a pressure distribution when the right hand grip sensor 71R is pushed and left hand grip sensor 71L is pulled. When the processor 81 analyzes output of the grip sensor 71 and determines that the right hand grip sensor 71R is being pushed and the left hand grip sensor 71L is being pulled, the processor 81 may set a target value of the rotation speed and rotation direction of the motor to the wheel drive controller 82 so that the manually propelled vehicle 1 turns to the left. The wheel drive controller 82 may drive and control the drive wheel 31 via the wheel drive mechanism 91 based on the set parameter. By controlling the rotation speed and rotation direction of the left and right drive wheels 31 independently, the manually propelled vehicle 1 can be turned.

Figure 8:
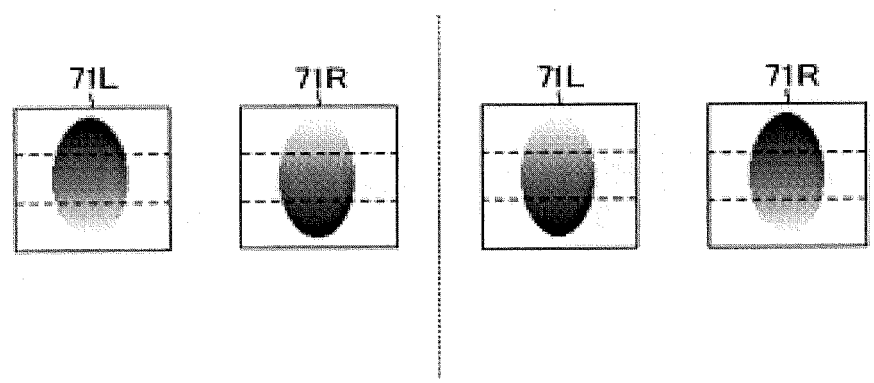
FIG. 8 may be an illustration of an example of a pressure distribution when left and right grip sensors are held according to one or more embodiments.

Similarly, the right side of FIG. 8 illustrates one example of a pressure distribution when the left hand grip sensor 71L is pushed and the right hand grip sensor 71R is pulled. When processor 81 analyzes output of the grip sensor 71 and determines that the left hand grip sensor 71L is being pushed and the right hand grip sensor 71R is being pulled, the manually propelled vehicle 1 may be driven and controlled so that the manually propelled vehicle turns to the right.

Figure 9:
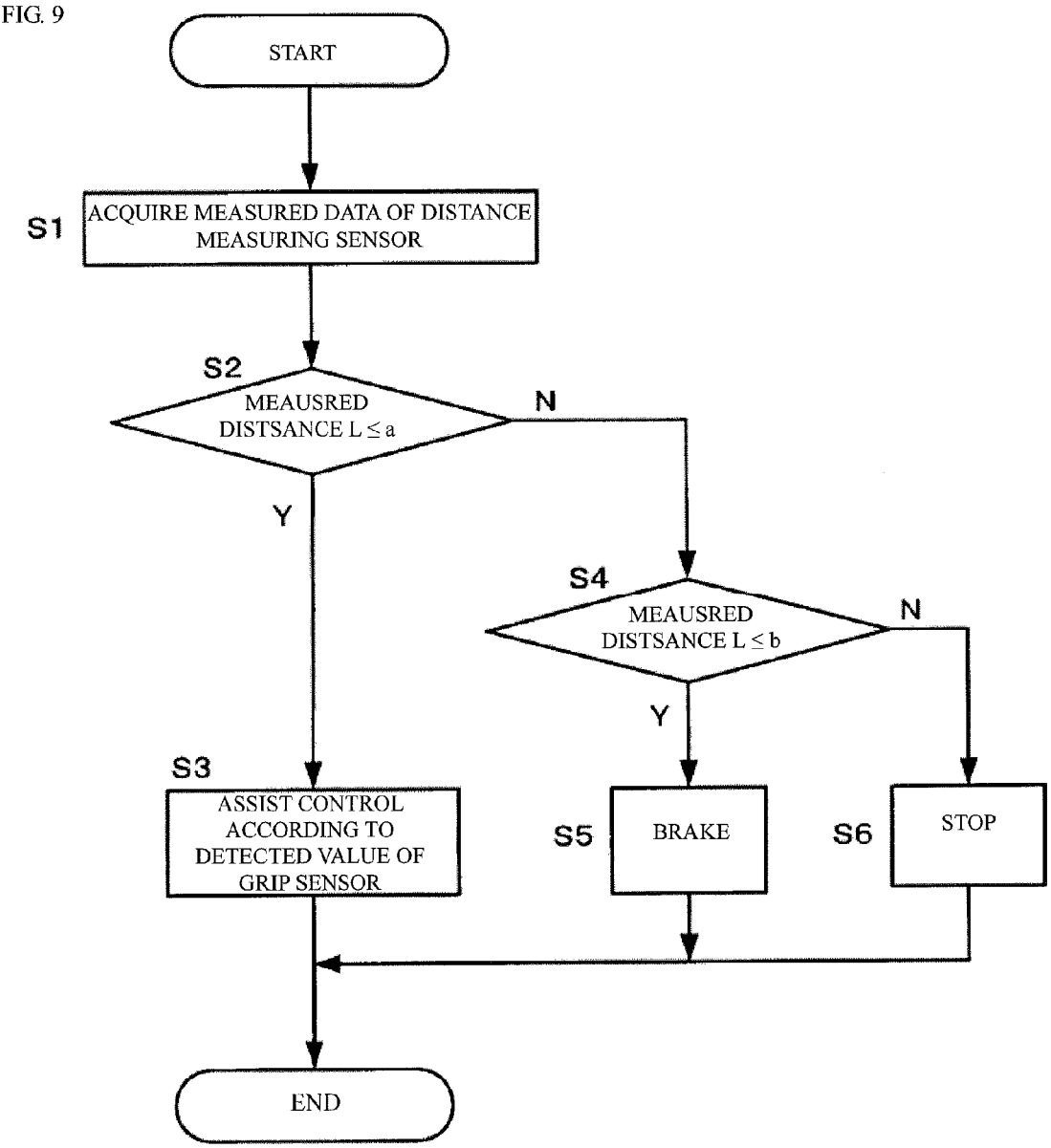
FIG. 9 may be a flowchart relating to an abnormal condition detecting process that uses a distance measuring sensor according to one or more embodiments of the first example of the present invention.

The manually propelled vehicle 1 according to one or more embodiments of the present invention can detect an abnormal condition of the user by using the distance measuring sensor 72. FIG. 9 shows a flowchart relating to an abnormal condition detecting process using the distance measuring sensor 72 according to one or more embodiments.

The process shown in FIG. 9 may be carried out regularly. First, in step 1, the processor 81 may acquire measured data of the distance measuring sensor 72. Further, the process proceeds to step S2, and the processor 81 may determine whether or not the measured distance L by the distance measuring sensor 72 is a first predetermined distance (a) or less. Here, the first predetermined distance (a) may be set in consideration of the distance between the manually propelled vehicle 1 and the user when the user uses the manually propelled vehicle 1 normally. That is, the first predetermined distance (a) may be a distance defining a standard state or a state of normal use of the manually propelled vehicle. Since the physique, such as the length of the arm or the like differs by user, the first predetermined distance (a) and a second predetermined distance (b), which will be described later, may be set variably according to the user.

In step S2, when the measured distance L is equal to or less than the first predetermine distance (Y in step S2), the processor 81 may detect a standard state where the user uses the manually propelled vehicle 1 normally, and the process proceeds to step S3. In step S3, the controller 80 performs an assist control (drive control) according to the sensor data of the grip sensor 71 (force sensor). For the assist control in this situation, the forward and turn control as described above may be performed.

Meanwhile, in step S2, if the measured distance L is longer than the first predetermined distance (a) (N in step S2), the process proceeds to step S4. Then, the processor 81 may determine whether or not the measured distance L is equal to or less than the second predetermined distance (b). Here, the second predetermined distance b may be a length longer than the first predetermined distance (a). If the measured distance L is equal to or less than the second predetermined distance (b) (Y in step S4), the process proceeds to step S5. Then, the processor 81 may lower the target value of the rotation speed of the motor, and the drive wheel 31 may be decelerated and controlled by the wheel drive controller 82.

Further, if the measured distance L is longer than the second predetermined distance (b) (N in step S4), the process proceeds to step S6. Then, the processor 81 may set the target value of the rotation speed for the motor to zero, and the drive wheel 31 may be controlled and stopped by the wheel drive controller 82. That is, the manually propelled vehicle 1 may be stopped.

As described above, when the measured distance L is longer than the first predetermined distance (a), the processor 81 may determine that an abnormal condition has occurred by deviating from the standard state, and the manually propelled vehicle 1 is braked or stopped. For example, if a leg of the user cannot keep up with the manually propelled vehicle 1 moving forward, and the user is in a posture of falling forward, the user can be prevented from falling down.

Figure 10A:
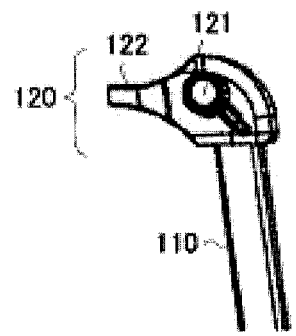
FIG. 10A may be a partial side view of the manually propelled vehicle according to one or more embodiments.
Figure 10B:
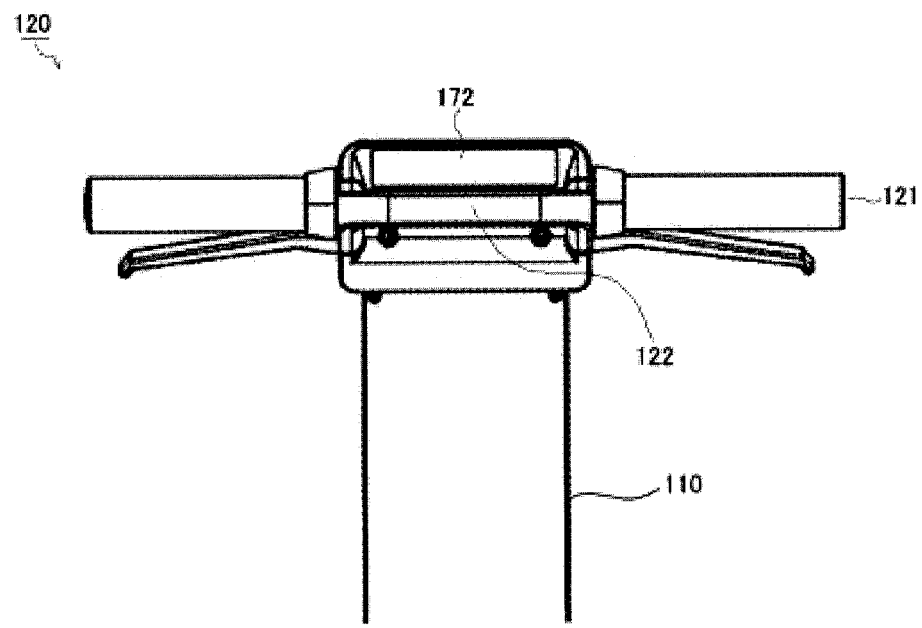
FIG. 10B may be a partial rear view of the manually propelled vehicle according to one or more embodiments.

One or more embodiments of the present example may use, for example, a handle configuration as illustrated in FIG. 10A and FIG. 10B. FIG. 10A and FIG. 10B are a side view and a rear view illustrating a handle configuration of the manually propelled vehicle according to one or more embodiments.

As illustrated in FIG. 10 A and FIG. 10B, a handle 120, which may be a member for the user to hold when walking, may be connected to a vehicle body (not illustrated) by a support post part 110. The handle 120 may comprise a handle bar 121 and a middle handle 122. The user can move the manually propelled vehicle forward, backward, and turn by applying human power by holding both end parts of the handle bar 121 with both hands or applying human power by holding the middle handle 122 with one hand.

Figure 11:
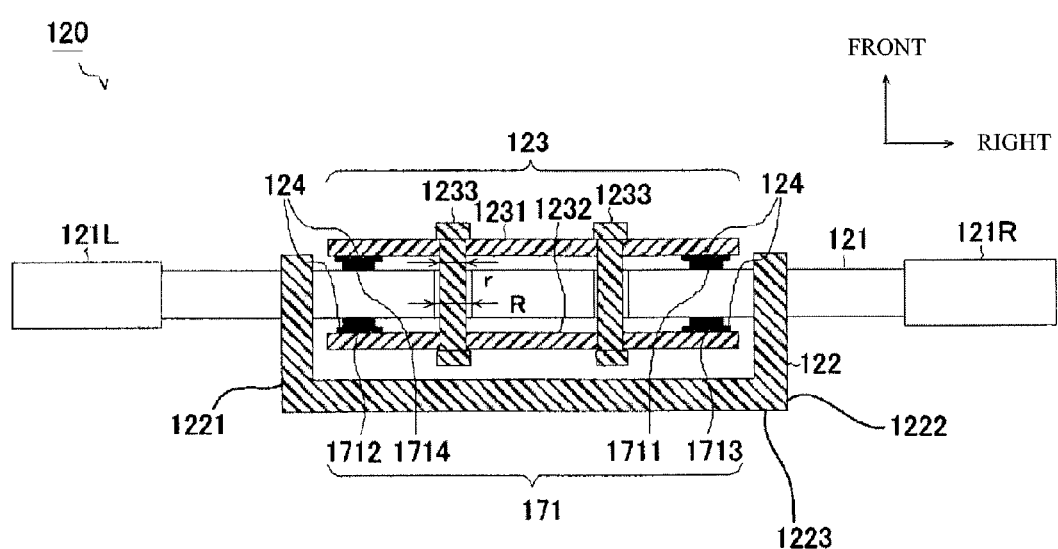
FIG. 11 may be a plan view of a handle according to one or more embodiments.

FIG. 11 is a plan view of the handle 120 (when the exterior member of the handle 120 is removed). As illustrated in the drawing, the handle 120 may include the handle bar 121, the middle handle 122, a handle holder 123, and a neutral holding section 124. FIG. 11 substantially illustrates the handle 120 as a plan view when viewed from above; however, an engaging portion (mating portion of a guide pin 1233) between the handle bar 121 and the handle holder 123 is illustrated in a horizontally cross-sectional view so as to easier understand the structure.

The handlebar 121 may be a rod-like member for the user to hold with both hands, and the left grip 121L and the right grip 121R may be respectively provided in both end parts in the lengthwise direction to make it easier for the user to hold with both hands. Further, a pair of guide pin fitting holes (diameter: R) that pass through in the front and back direction of the left and right both sides of the central section in the lengthwise direction may be drilled in the handlebar 121. Furthermore, a handle sensor 171 (force sensor) that detects a displacement state of the handlebar 121 may be attached on the surface of the handlebar 121.

The handle sensor 171 may include a first sensor 1711, a second sensor 1712, a third sensor 1713, and a fourth sensor 1714. The first to fourth sensors (1711 to 1714) may be all pressure-sensitive electrically conductive elements that convert a change in pressure into change in electrical resistance. However, the first to fourth sensors 1711 to 1714 are not limited to the pressure-sensitive electrically conductive elements, and, for example, a mechanical switch may be used, or an optical sensor or the like that detects proximity or distance between the handlebar 121 and the handle holder 123 may be used.

The middle handle 122 may be a U-shaped member for the user to hold with one hand, and includes linkage parts 1221 and 1222, and a middle grip 1223. One end of each of the linkage parts 1221 and 1222 may be rigidly coupled to handlebar 121 in two locations (positions that sandwich the handle holder 123) in the lengthwise direction nearer to the center than the left and right grips 121L and 121R. The other ends of the linkage parts 1221 and 1222 may be respectively extended to the user side (rear side), and the middle grip 1223 may be integrally formed so as to connect each.

As described above, the middle handle 122 may be rigidly coupled between two points of the central portion in the lengthwise direction of the handlebar 121, so the operating force applied to the middle grip 1223 may be transferred to the handle bar 121 via the linkage parts 1221 and 1222. Accordingly, even in a condition that the user cannot operate the handle bar 21 by both hands (such as when holding an umbrella in one hand), the user can freely move the manually propelled vehicle 1 forward, backward, and turning by operating the middle handle 122 with one hand.

The handle holder 123 may be fixed to the strut post 110, and supports the handlebar 121 while allowing a displacement of the handlebar 121 within a predetermined range. The handle holder 123 may include two guide pins 1233 (diameter: R) as members to support the handlebar 121. The guide pins 1233 may be fitted to the guide pin fitting holes in the handlebar 121. Accordingly, the displacement of the handlebar 121 may be fundamentally restricted to the axial direction (front and back direction) of the guide pins 1233.

However, the diameter R of the guide pin fitting hole drilled into the handlebar 121 may be designed to be slightly larger than the diameter r of the guide pin 1233. That is, intentional fitting play may be provided in the handle holder 123. Therefore, the handlebar 121 may not only be displaced in the forward and rearward directions, but may also be displaced in the left and right turning directions within a predetermined range (within the play range by the fitting play) by receiving the operating force by the user.

The neutral holding section 124 may be a member for biasing back the handlebar 121 to the neutral position. In one or more embodiments, an elastic member may be provided between the handlebar 121 and the handle holder 123 as a neutral holding section 124. For the elastic member, sponge, rubber in which a variety of hardness is selectable, or a metal, resin, or the like having resilient properties such as a leaf spring may be suitably used. Further, when the first to fourth sensors 1711 to 1714 themselves are made of an elastic member, an elastic member may not be provided in each local contact location.

Here, by applying human power by holding the left grip 121L and the right grip 121R with both hands, or holding the middle handle 122 with one hand, a pattern may be generated in the pressure applied to the first to fourth sensors 1711 to 1714. For example, when the handlebar 121 is pushed in the forward direction, the pressure may be applied to the first sensor 1711 and the fourth sensor 1714, and no pressure may be applied to the second sensor 1712 and the third sensor 1713. Further, when the handlebar 121 is pulled backward, no pressure may be applied to the first and fourth sensors 1711 and 1714, and the pressure may be applied to the second and third sensors 1712 and 1713. Furthermore, when the handlebar 121 is in the neutral position where the handlebar 121 is neither pushed nor pulled, no pressure may be applied to the first to fourth sensors 1711 to 1714 (or slight pressure may be applied).

Moreover, when the handlebar 121 is turned left, the pressure may be applied to the first sensor 1711 and the second sensor 1712 on the diagonal line, and no pressure may be applied to the third sensor 1713 and the fourth sensor 1714. Also, when the handlebar 121 is turned right, the pressure may be applied to the third sensor 1713 and the fourth sensor 1714 on the diagonal line, and no pressure may be applied to the first sensor 1711 and the second sensor 1712.

As described above, the operation state of the handlebar 121 can be specified by the detected pattern of the first to fourth sensors 1711 to 1714 (force sensor), and therefore, a drive control that moves the manually propelled vehicle forward, backward, or turning may be performed according to the detected pattern. Then, such assist control may be performed in step S3 in the process illustrated in FIG. 9 described above. Further, as illustrated in FIG. 10, because the distance measurement sensor 172 that measures the distance between the user and the manually propelled vehicle is provided in the central part in the left and right lengthwise direction of the handle 120, the distance measurement sensor 172 may be used in the process illustrated in FIG. 9.

Second Example

Next, one or more embodiments of a second example of the present invention will be described. A manually propelled vehicle according to one or more embodiments of the present example may be configured similar to that of the manually propelled vehicle 1 of one or more embodiments of the first example described above, and an assist control according to sensor data of the grip sensor 71 (force sensor) as described in one or more embodiments of the first example may be performed.

Further, in one or more embodiments of the present example, sensor data of the grip sensor 71 and the distance measuring sensor 72 may be collected in each pattern of the state of normal use of the manually propelled vehicle 1 by a user. Here, the following examples are included as the pattern of the state of normal use:

when a user starts walking by holding the grip 20 (grip sensor 71);

when the grip 20 is held and the manually propelled vehicle 1 accelerates while moving forward;

when the grip 20 is held and the manually propelled vehicle decelerates while moving forward;

when the grip 20 is held and the manually propelled vehicle 1 moves forward at a constant speed;

when the grip 20 is held and the manually propelled vehicle 1 accelerates while moving backward;

when the grip 20 is held and the manually propelled vehicle 1 decelerates while moving backward;

when the grip 20 is held and the manually propelled vehicle 1 moves backward at a constant speed;

when the grip 20 is held and the manually propelled vehicle 1 turns; and when the grip 20 is held and the manually propelled vehicle 1 is stationary.

The processor 81 (FIG. 2) may collect sensor data of the grip sensor 71 and the distance measuring sensor 72 in each pattern of the state of normal use and calculates statistics, for example, a mean value and variations (such as standard deviation) based on the collected data. For the grip sensor 71, for example, the processor 81 calculates a mean value of the sum of each detected value of a plurality of pressure sensors PS (FIG. 6), or the like. For the distance measuring sensor 72, the processor 81 calculates the mean value of the measured distance.

That is, the processor 81 may learn and set the standard state in each pattern of the state of normal use according to a usage trend by the user. The processor 81 may determine that an abnormal condition has occurred when the processor 81 may determine that deviation has occurred from the standard state based on the sensor data of the grip sensor 71 and the distance measuring sensor 72, and the standard state that has been set. In this case, for example, the processor 81 may control and drive the drive wheel 31 to brake or stop via the wheel drive controller 82.

One or more embodiments of the present example can control the manually propelled vehicle suitably according to the state of the user in this manner.

Third Example

Next, one or more embodiments of a third example of the present invention will be described. A manually propelled vehicle according to one or more embodiments of the present example may be configured similar to that of the manually propelled vehicle 1 of one or more embodiments of the first example described above, and an assist control according to sensor data of the grip sensor 71 (force sensor) as described in one or more embodiments of the first example may be performed.

When the user is walking, a distance between the user and the manually propelled vehicle 1 may be irregular, and varies in synchronization with a gait cycle. Accordingly, the detected value of the distance measuring sensor 72 may vary cyclically. The detected values (such as a sum of each detected value of a plurality of the pressure sensors PS (FIG. 6)) of the left and right grip sensor 71 (left hand grip sensor 71L and the right hand grip sensor 71R) may also vary in synchronization with the gait cycle.

However, due to unevenness of a road surface where the manually propelled vehicle 1 travels or the like, there may be cases in which a fluctuation of shorter cycle than that by the gait appears in the detected values of the grip sensor 71 and the distance measuring sensor 72. As a result, the processor 81 cuts a cycle level shorter than the gait cycle, for example, by carrying out a low-pas filter or the like relative to the detected value or the grip sensor 71 (at least any one of left or right) and the distance measuring sensor 72. Therefore, if there may be a cyclical fluctuation in data after the process, the processor 81 can determine that the user is walking in the normal state.

When the processor 81 may determine that the user is walking in the normal state according to the description above, the processor 81 may continue the assist control. On the other hand, when there is no cyclical fluctuation in data after the process described above in at least any of the grip sensor 71 and the distance measuring sensor 72, an abnormal condition may be assumed, for example, such as the user is holding the grip 20 while riding on the manually propelled vehicle 1 without touching the foot on the road. Accordingly, the processor 81 may drive and control the drive wheel 31 via the wheel drive controller 82 to brake or stop the manually propelled vehicle 1.

In this manner, one or more embodiments of the present example can control the manually propelled vehicle appropriately according to the state of the user.

Fourth Example

Next, one or more embodiments of a fourth example of the present invention will be described. A configuration of a manually propelled vehicle according to one or more embodiments of the present example may be similar to that of the manually propelled vehicle 1 in one or more embodiments of the first example described above. One or more embodiments of the present example relates to an assist control when holding the grip 20 with one hand, and a description will be given following the flowcharts shown in FIGS. 12A and 12B.

Figure 12A:
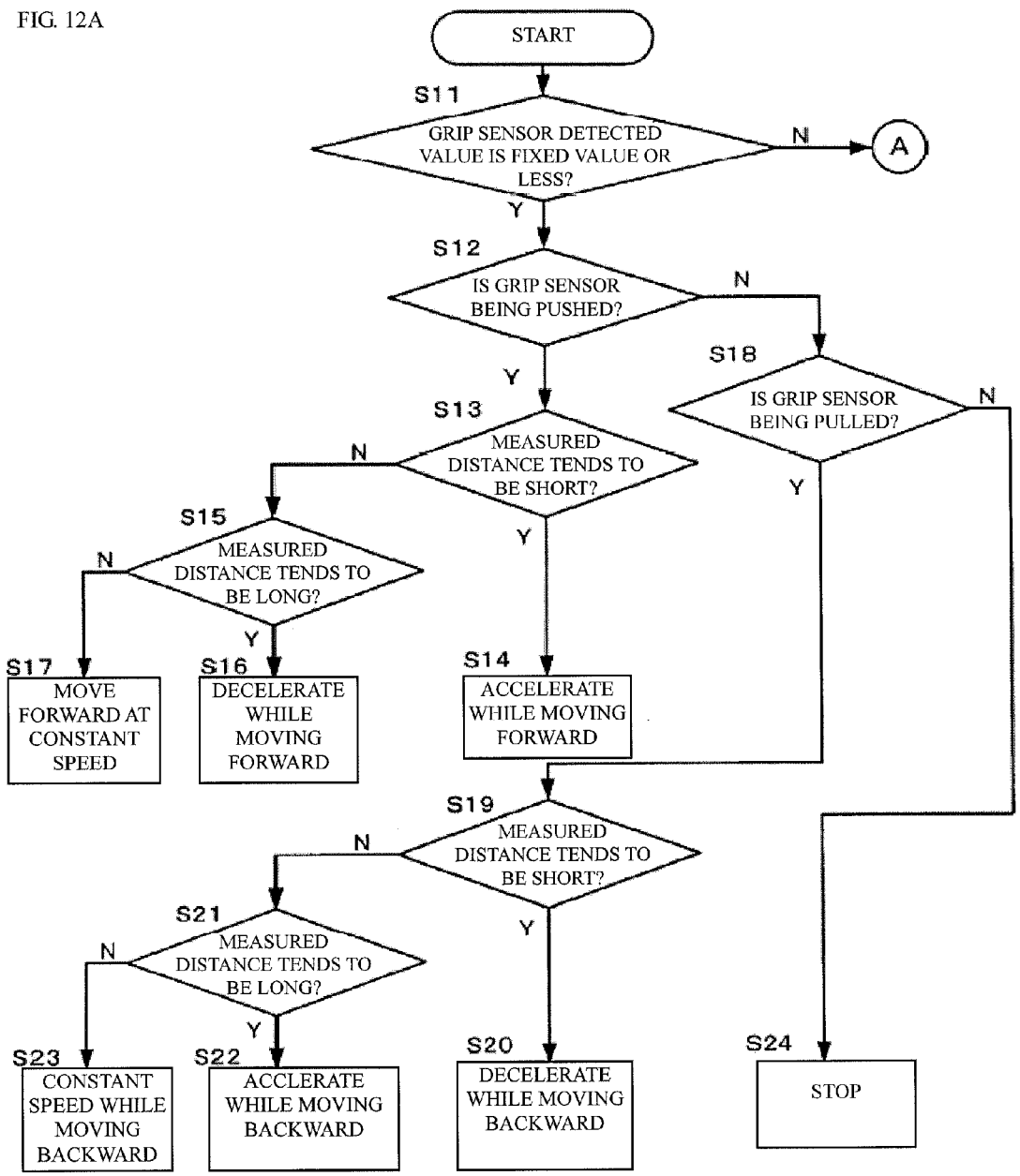
FIG. 12A may be a flowchart relating to an assist control when holding a grip with one hand according to one or more embodiments of a fourth example of the present invention.
Figure 12B:
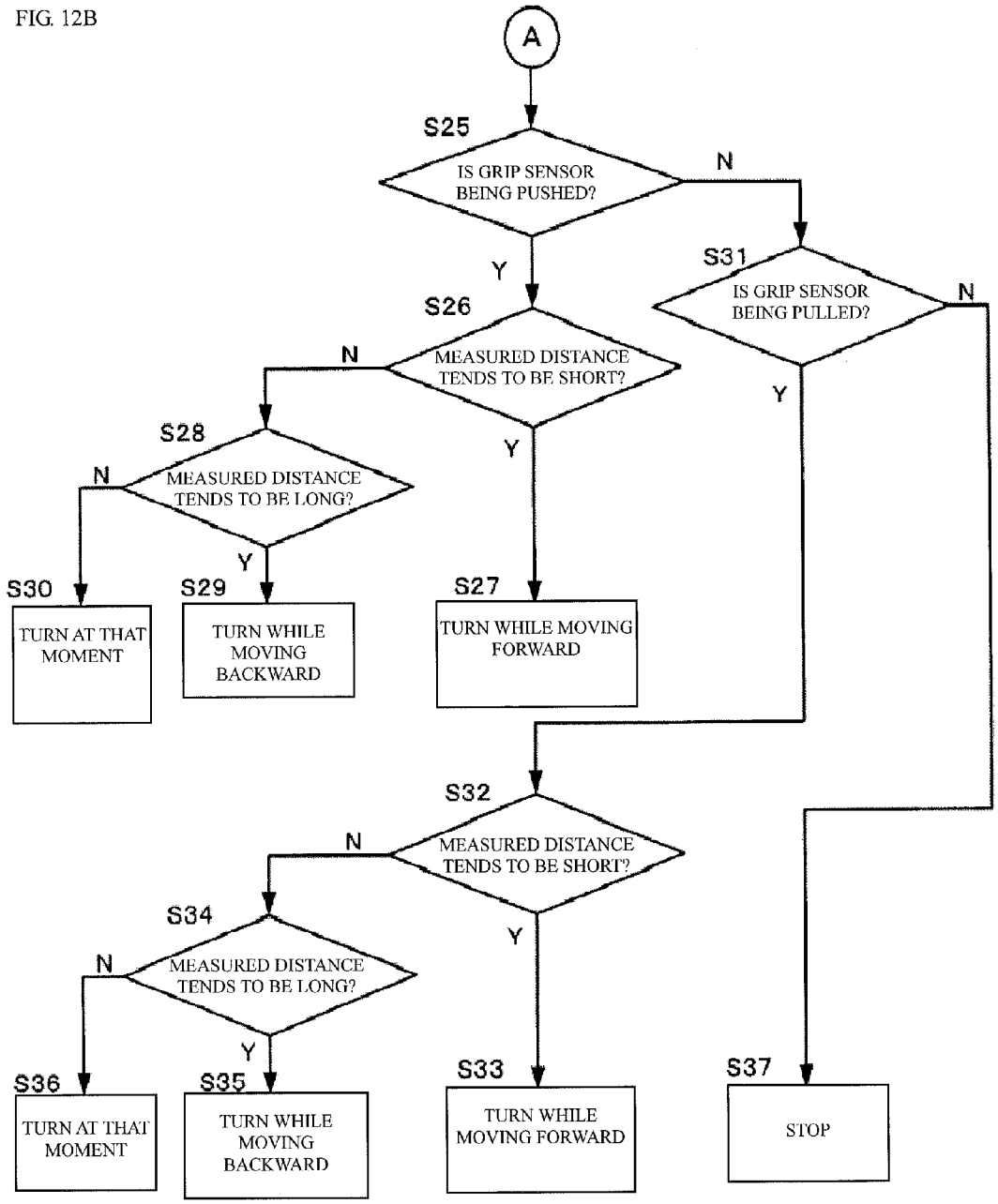
FIG. 12B may be a flowchart relating to the assist control when holding the grip with one hand according to one or more embodiments of the fourth example of the present invention.

Processes shown in FIGS. 12A and 12B may be initiated when the processor 81 (FIG. 2) determines that the grip 20 is held with one hand by either one of the left or right hands based on the output of the grip sensor 71 and is carried out for each time of determination.

When the flowchart in FIG. 12A is started, the processor 81 may determine first in step S11 whether or not a detected value (such as a sum of each detected value of a plurality of pressure sensors PS (FIG. 6)) of the grip sensor 71 (either one of the left hand grip sensor 71L or the right hand grip sensor 71R) being held is equal to or less than a predetermined value. If the determination result is equal to or less than the predetermined value (Y in step S11), the process proceeds to step S12. Then, the processor 81 may determine whether or not the grip sensor 71 is being pushed based on the sensor data of the grip sensor 71.

If the grip sensor 71 is pushed (Y in step S12), the process proceeds to step S13. Then, the processor 81 may determine whether or not a measured distance tends to be short based on the output of the distance measuring sensor 72. If the determination result tends to be short (Y in step S13), the processor 81 may estimate that the user has an intent to accelerate while moving forward, and the process proceeds to step S14. Then, the processor 81 may drive and control the drive wheel 31 via the wheel drive controller 82 so that the manually propelled vehicle 1 may be accelerated while moving forward.

In step S13, if the measured distance does not tend to be short (N in step S13), the processor 81 may further determine in step S15 whether or not the measured distance tends to be long. If the determination result tends to be long (Y in step S15), the processor 81 may estimate that the user has an intent to decelerate while moving forward, and the process proceeds to step S16. Then, the processor 81 may drive and control the drive wheel 31 via the wheel drive controller 82 so that the manually propelled vehicle 1 is decelerated while moving forward.

In step S15, if the measured distance does not tend to be long (N in step S15), in other words when the measured distance tends to be constant, the processor 81 may estimate that the user has an intent to move forward at a constant speed, and the process proceeds to step S17. Then, the processor 81 may drive and control the drive wheel 31 via the wheel drive controller 82 so that the manually propelled vehicle 1 moves forward at a constant speed.

Further, in step S12, if the grip sensor 71 is not being pushed (N in step S12), the processor 81 may further determine in step S18 whether or not the grip sensor 71 is being pulled. If the grip sensor 71 is being pulled (Y in step S18), the process proceeds to step S19, and the processor 81 may determine whether or not the measured distance tends to be short based on the output of the distance measuring sensor 72. If the determination result tends to be short (Y in step S19), the processor 81 may estimate that the user has an intent to decelerate while moving backward, and the process proceeds to step S20. Then, the processor 81 may drive and control the drive wheel 31 via the wheel drive controller 82 so that the manually propelled vehicle 1 is decelerated while moving backward.

In step S19, if the measured distance does not tend to be short (N in step S19), the processor 81 may further determine in step S21 whether or not the measured distance tends to be long. If the determination result tends to be long (Y in step S21), the processor 81 may estimate that the user has an intent to accelerate while moving backward, and the process proceeds to step S22. Then, the processor 81 may drive and control the drive wheel 31 via the wheel drive controller 82 so that the manually propelled vehicle 1 may be accelerated while moving backward.

In step S21, if the measured distance does not tend to be long (N in step S21), in other words when the measured distance tends to be constant, the processor 81 may estimate that the user has an intent to move backward at a constant speed, and the process proceeds to step S23. Then, the processor 81 may drive and control the drive wheel 31 via the wheel drive controller 82 so that the manually propelled vehicle 1 moves backward at a constant speed.

Furthermore, in step S18, when the grip sensor 71 is not being pulled (N in step S18), in other words, when the grip sensor 71 is neither pushed nor pulled, the step proceeds to step S24. Then, the processor 81 may drive and control the drive wheel 31 via the wheel drive controller 82 so that the manually propelled vehicle 1 is stopped.

Moreover, in step S11, when the detected value of the grip sensor 71 is greater than the predetermined value (N in step S11), the process proceeds to step S25 (FIG. 12B), and the processor 81 may determine whether or not the grip sensor 71 is being pushed based on the sensor data of the grip sensor 71.

If the grip sensor 71 is being pushed (Y in step S25), the process proceeds to step S26, and the processor 81 may determine whether or not the measured distance tends to be short based on the output of the distance measuring sensor 72. If the determination result tends to be short (Y in step S26), the process proceeds to step S27, and the processor 81 may drive and control the drive wheel 31 via the wheel drive controller 82 so that the manually propelled vehicle 1 is turned while moving forward. When the left hand grip sensor 71L is held, a right turn may be carried out, and when the right hand grip sensor 71 R is held, a left turn may be carried out (steps S29 and 30 may also be performed in like manner).

In step 26, if the measured distance does not tend to be short (N in step S26), the processor 81 further may determine in step S28 whether or not the measured distance tends to be long. If the determination result tends to be long (Y in step S28), the process proceeds to step S29, and the processor 81 may drive and control the drive wheel 31 via the wheel drive controller 82 so that the manually propelled vehicle 1 is turned while moving backward.

In step S28, if the measured distance does not tend to be long (N in step S28), in other words when the measured distance tends to be constant, the process proceeds to step S30. Then, the processor 81 may drive and control the drive wheel 31 via the wheel drive controller 82 so that the manually propelled vehicle 1 is turned at that moment.

Further, in step S25, if the grip sensor 71 is not being pushed (N in step S25), the processor 81 further may determine in step S31 whether or not the grip sensor 71 is being pulled. If the grip sensor 71 is being pulled (Y in step S31), the process proceeds to step S32, and the processor 81 may determine whether or not the measured distance tends to be short based on the output of the distance measuring sensor 72. If the determination result tends to be short (Y in step S32), the process proceeds to step S33, and the processor 81 may drive and control the drive wheel 31 via the wheel drive controller 82 so that the manually propelled vehicle 1 is turned while moving forward. When the left hand grip sensor 71L is held, a left turn may be carried out, and when the right hand grip sensor 71 R is held, a right turn may be carried out (steps S35 and 36 may also be performed in like manner).

In step S32, if the measured distance does not tend to be short (N in step S32), the processor 81 further may determine in step S34 whether or not the measured distance tends to be long. If the determination result tends to be long (Y in step S34), the process proceeds to step S35, and the processor 81 may drive and control the drive wheel 31 via the wheel drive controller 82 so that the manually propelled vehicle 1 is turned while moving backward.

In step S34, if the measured distance does not tend to be long (N in step S34), in other words when the measured distance tends to be constant, the process proceeds to step S36. Then, the processor 81 may drive and control the drive wheel 31 via the wheel drive controller 82 so that the manually propelled vehicle 1 is turned at that moment.

Furthermore, in step S31, when the grip sensor 71 is not being pulled (N in step S31), in other words, when the grip sensor is neither pushed nor pulled, the step proceeds to step S37. Then, the processor 81 may drive and control the drive wheel 31 via the wheel drive controller 82 so that the manually propelled vehicle 1 is stopped.

According to one or more embodiments of the present example, even when the user operates by one hand (when carrying a baggage or the like in one hand), an appropriate operation that reflects the intent of a user can be carried out on the manually propelled vehicle.

According to one or more embodiments of the present example, a handle configuration as illustrated in the previously described FIG. 11 may be used. In this case, a grip sensor may be further provided respectively in locations (the left and right grips 121L and 121R of left and right in FIG. 11, or the like) where the user holds the grip. The grip sensor need not necessarily be composed of a plurality of sensors as illustrated in FIG. 6, and it may be a single body sensor that detects the grip force.

Further, in the processes shown FIGS. 12A and 12B, it may be determined by using the detected value of the grip sensor in step S11, and pushing or pulling of the handlebar 121 (including turning state due to holding with one hand) may be determined by using outputs of the first to fourth sensors 1711 to 1714 (FIG. 11) in steps S12, S18, S25, and S31.

Fifth Example

Next, one or more embodiments of a fifth example of the present invention will be described. A configuration of a manually propelled vehicle according to one or more embodiments of the present example may be similar to that of the manually propelled vehicle 1 in one or more embodiments of the first example described above. One or more embodiments of the present example relates to an assist control when holding the grip 20 with both hands, and a description will be given following the flowcharts shown in FIGS. 13A and 13C.

Figure 13A:
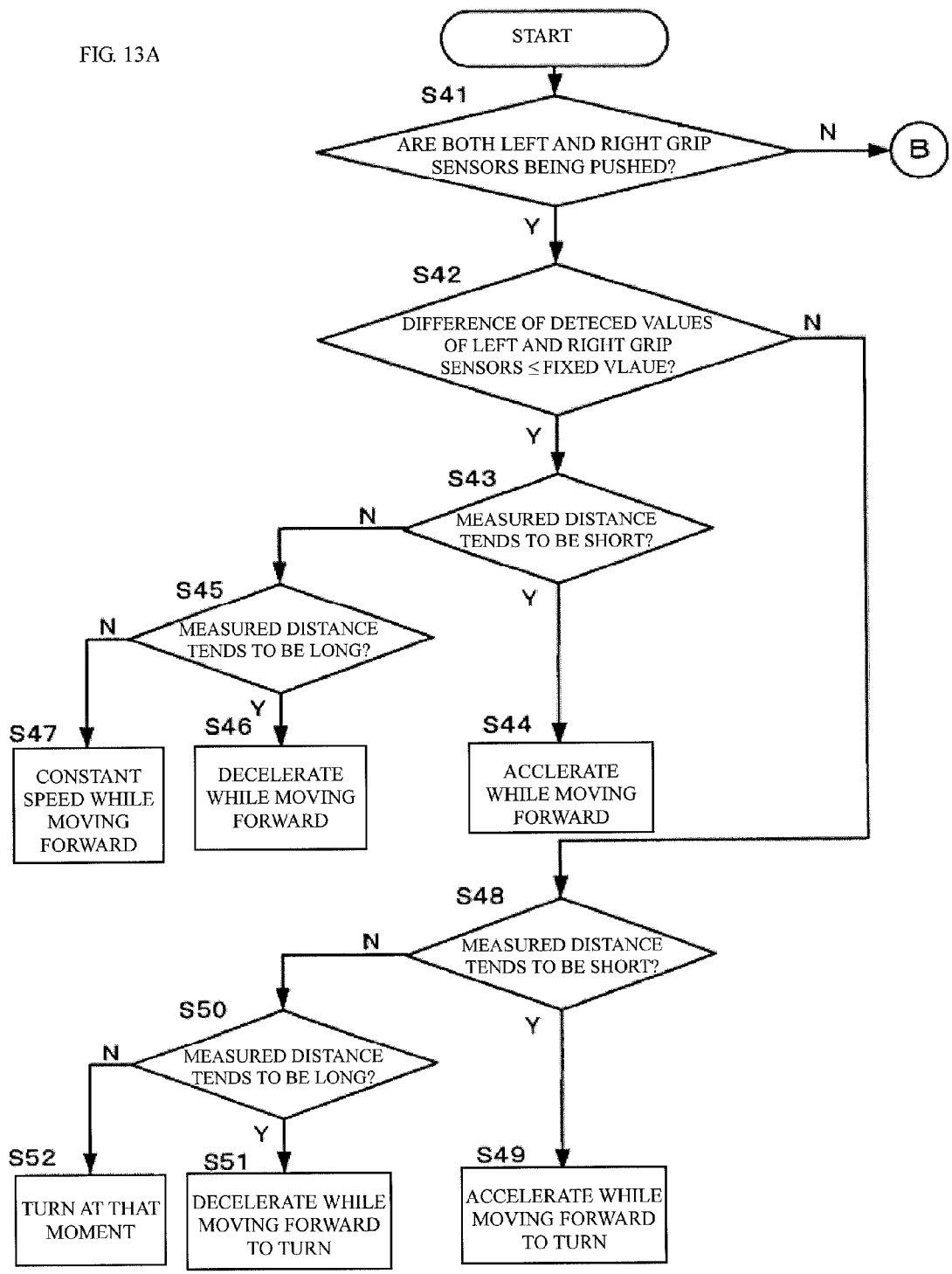
FIG. 13A may be a flowchart relating to an assist control when holding a grip with both hands according to one or more embodiments of a fifth example of the present invention.
Figure 13B:
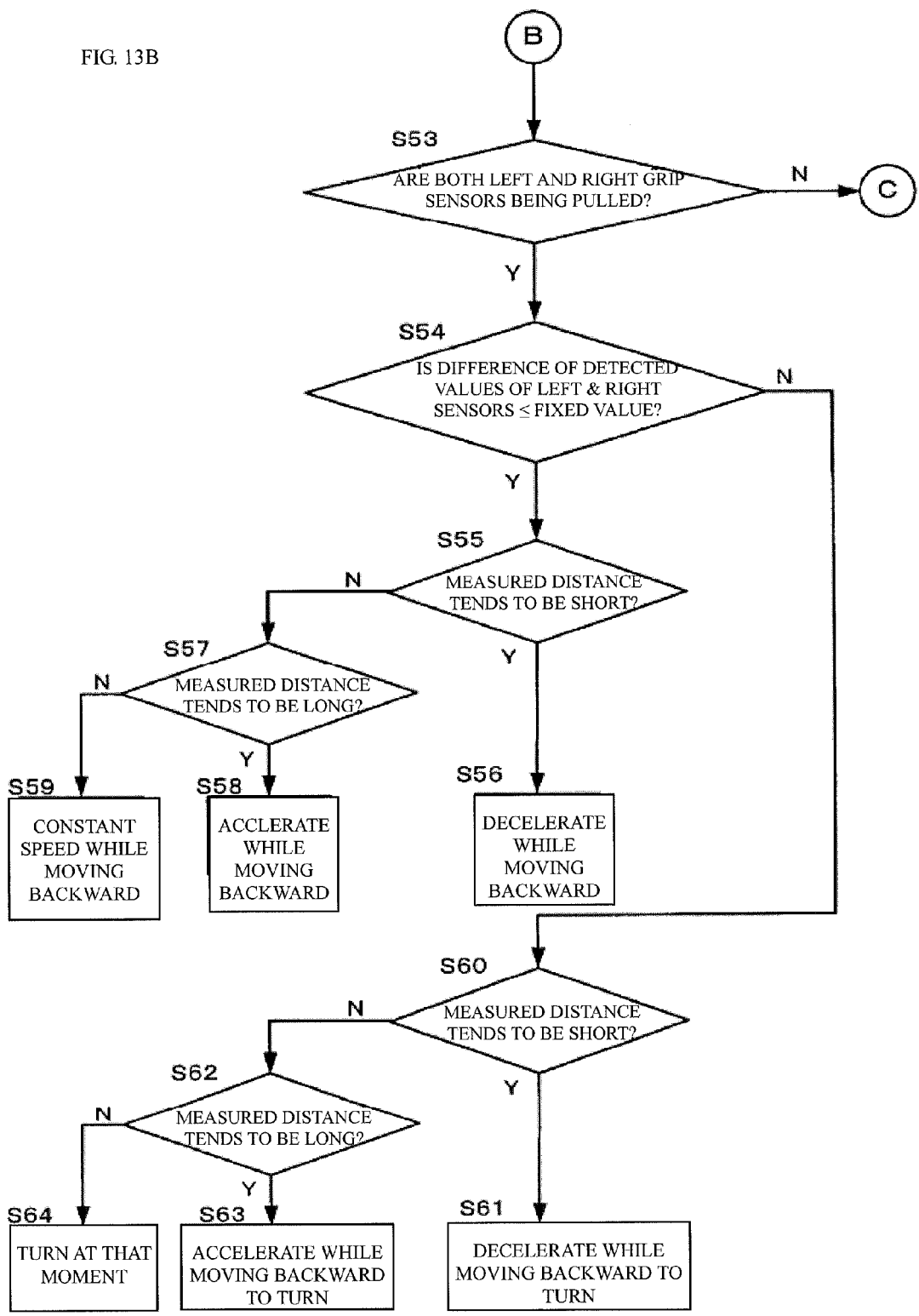
FIG. 13B may be a flowchart relating to the assist control when holding the grip with both hands according to one or more embodiments of the fifth example of the present invention.
Figure 13C:
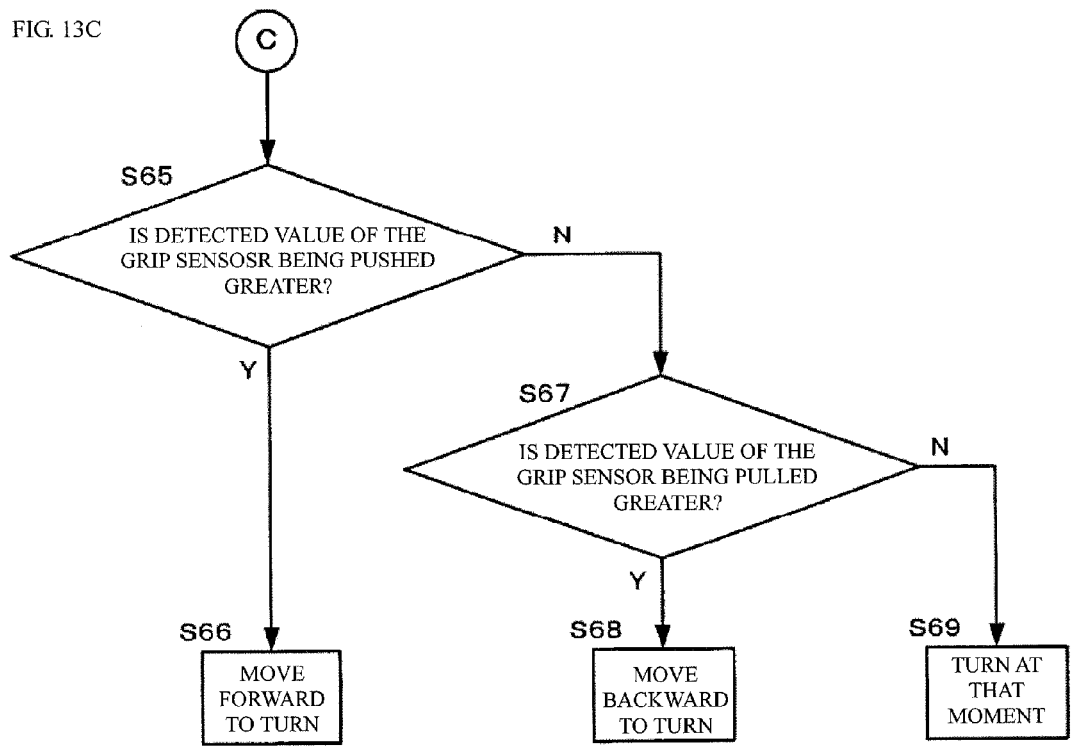
FIG. 13C may be a flowchart relating to an assist control when holding the grip with both hands according to one or more embodiments of the fifth example of the present invention.

Processes shown in FIGS. 13A and 13C may be initiated when the processor 81 (FIG. 2) determines that the grip 20 is held with both hands based on the output of the grip sensor 71 and may be carried out for each time of determination.

When the flowchart in FIG. 13A is started, the processor 81 may determine first in step S41 whether or not the left hand grip sensor 71L and the right hand grip sensor 71R are both being pushed based on the output of the grip sensor 71. If both are being pushed (Y in step S41), the process proceeds to step S42, and the processor 81 may determine whether or not a difference in each detected value (such as a sum of each detected value of a plurality of pressure sensors PS (FIG. 6))

of the left hand grip sensor 71L and the right hand grip sensor 71R is equal to or less than a predetermined value.

If the difference of the detected value is equal to or less than the predetermined value (Y in step S42), the process proceeds to step S43, and the processor 81 may determine whether or not a measured distance tends to be short based on the output of the distance measuring sensor 72. If the determination result tends to be short (Y in step S43), the process proceeds to step S43 by estimating that the user has an intent to accelerate while moving forward. Then, the processor 81 may drive and control the drive wheel 31 via the wheel drive controller 82 so that the manually propelled vehicle 1 accelerates while moving forward.

In step S43, if the measured distance does not tend to be short (N in step S43), the processor 81 further may determine in step S45 whether or not the measured distance tends to be long. If the determination result tends to be long (Y in step S45), the process proceeds to step S16 by estimating that the user has an intent to decelerate while moving forward. Then, the processor 81 may drive and control the drive wheel 31 via the wheel drive controller 82 so that the manually propelled vehicle 1 decelerates while moving forward.

In step S45, if the measured distance does not tend to be long (N in step S45), in other words when the measured distance tends to be constant, the processor 81 may estimate that the user has an intent to move forward at a constant speed, and the process proceeds to step S47. Then, the processor 81 may drive and control the drive wheel 31 via the wheel drive controller 82 so that the manually propelled vehicle 1 moves forward at a constant speed.

In step S42, if the difference of the left and right detected value is greater than the predetermined value (N in step S42), the process proceeds to step S48. Then, the processor 81 may determine whether or not the measured distance tends to be short based on the output of the distance measuring sensor 72. If the determination result tends to be short (Y in step S48), the process proceeds to step S49, and the processor 81 may drive and control the drive wheel 31 via the wheel drive controller 82 so that the manually propelled vehicle 1 may be accelerated while moving forward to turn. When the detected value of the left hand grip sensor 71L is greater between the left and right, a right turn may be carried out, and when the detected value of the right hand grip sensor 71 R is greater, a left turn may be carried out (steps S51 and 52 may also be performed in like manner).

In step S48, if the measured distance does not tend to be short (N in step S48), the processor 81 may further determine in step S50 whether or not the measured distance tends to be long. If the determination result tends to be long (Y in step S50), the process proceeds to step S51, and the processor 81 may drive and control the drive wheel 31 via the wheel drive controller 82 so that the manually propelled vehicle 1 is decelerated while moving forward to turn.

In step S50, if the measured distance does not tend to be long (N in step S50), in other words when the measured distance tends to be constant, the process proceeds to step S52. Then, the processor 81 may drive and control the drive wheel 31 via the wheel drive controller 82 so that the manually propelled vehicle 1 is turned at that moment.

Further, in step S41, if neither the left hand grip sensor 71L nor the right hand grip sensor 71R are being pushed (N in step S41), the process proceeds to step S53 (FIG. 13B), and the processor 81 may determine whether or not both the left and right grip sensors 71L and 71R are being pulled.

If both left hand grip sensor 71L and the right hand grip sensor 71R are being pulled (Y in step S53), the process proceeds to step S54, and the processor 81 may determine whether or not the difference of each detected value of the left hand grip sensor 71L and the right hand grip sensor 71R is equal to or less than the predetermined value.

If the difference of the detected value is equal to or less than the predetermined value (Y in step S54), the process proceeds to step S55, and the processor 81 may determine whether or not the measured distance tends to be short based on the output of the distance measuring sensor 72. If the determination result tends to be short (Y in step S55), the processor 81 may estimate that the user has an intent to decelerate while moving backward, and the process proceeds to step S56. Then, the processor 81 may drive and control the drive wheel 31 via the wheel drive controller 82 so that the manually propelled vehicle 1 is decelerated while moving backward.

In step S55, if the measured distance does not tend to be short (N in step S55), the processor 81 may further determine in step S57 whether or not the measured distance tends to be long. If the determination result tends to be long (Y in step S57), the processor 81 may estimate that the user has an intent to accelerate while moving backward, and the process proceeds to step S58. Then, the processor 81 may drive and control the drive wheel 31 via the wheel drive controller 82 so that the manually propelled vehicle 1 may be accelerated while moving backward.

In step S57, if the measured distance does not tend to be long (N in step S57), in other words when the measured distance tends to be constant, the processor 81 may estimate that the user has an intention to move backward at a constant speed, and the process proceeds to step S59. Then, the processor 81 may drive and control the drive wheel 31 via the wheel drive controller 82 so that the manually propelled vehicle 1 moves backward at a constant speed.

In step S54, if the difference in the left and right detected values is greater than the predetermined value (N in step S54), the process proceeds to step S60. Then, the processor 81 may determine whether or not the measured distance tends to be short based on the output of the distance measuring sensor 72. If the determination result tends to be short (Y in step S60), the process proceeds to step S61, and the processor 81 may drive and control the drive wheel 31 via the wheel drive controller 82 so that the manually propelled vehicle 1 is decelerated while moving backward to turn. When the detected value of the left hand grip sensor 71 L is greater between the left and right, a left turn may be carried out, and when the detected value of the right hand grip sensor 71 R is greater, a right turn may be carried out (steps S63 and 64 may also be performed in like manner).

In step S60, if the measured distance does not tend to be short (N in step S60), the processor 81 may further determine in step S62 whether or not the measured distance tends to be long. If the determination result tends to be long (Y in step S62), the process proceeds to step S63, and the processor 81 may drive and control the drive wheel 31 via the wheel drive controller 82 so that the manually propelled vehicle 1 may be accelerated while moving backward to turn.

In step S62, if the measured distance does not tend to be long (N in step S62), in other words when the measured distance tends to be constant, the process proceeds to step S64. Then, the processor 81 may drive and control the drive wheel 31 via the wheel drive controller 82 so that the manually propelled vehicle 1 is turned at that moment.

Further, in step S53, when both of the left hand grip sensor 71L and the right hand grip sensor 71R are not being pulled (N in step S53), in other words, either one of the left or right grip sensors 71L or 71R is being pushed while the other is pulled, the process proceeds to step S65 (FIG. 13C).

In step S65, the processor 81 may determine whether or not the detected value of the grip sensor that is being pushed is greater than the other, if the determination result is (Y in step S65), the process proceeds to step S66. Then, the processor 81 may drive and control the drive wheel 31 via the wheel drive controller 82 so that the manually propelled vehicle 1 moves forward to turn.

Meanwhile, when the detected value of the grip sensor that is being pulled is greater than the other (N, in step S65, Y in step S67), the process proceeds to step S68. Then, the processor 81 may drive and control the drive wheel 31 via the wheel drive controller 82 so that the manually propelled vehicle 1 moves backward to turn.

Furthermore, when the both detected values of the grip sensor being pushed and the grip sensor being pulled are substantially equal (N in step S67), the process proceeds to step S69. Then, the processor 81 may drive and control the drive wheel 31 via the wheel drive controller 82 so that the manually propelled vehicle 1 is turned at that moment.

According to one or more embodiments of the present example described above, even when an operating force applied to the grip is extremely weak (e.g., when gripped by a user such as an elderly person), the manually propelled vehicle can be controlled and driven appropriately to accelerate or decelerate, and to move forward, backward, and turn that reflects an intent of the user (when Y in step 41, when Y in step S53). Further, when one of the left or right grip sensors is being pushed and the other is being pulled (N in step S53), the processor 81 may estimate that there may be a clear intent for a turning operation, and an appropriate turning drive control can be carried out.

According to one or more embodiments, for example, a handle of a configuration as illustrated in FIG. 11 described above may be used. In this case, a grip sensor may further be provided respectively in various locations (e.g., the left and right grips 121L and 121R of left and right in FIG. 11, or the like) where the user holds. The grip sensor need not necessarily be composed of a plurality of sensors as illustrated in FIG. 6, and it may be a single body sensor that detects the grip force.

Moreover, in the processes in FIGS. 13A to 13C, an operation state such as pushing, pulling and turning of the handlebar 121 may be determined by using outputs of the first to fourth sensors 1711 to 1714 (FIG. 11) in steps S41 and S53, and it may be determined by using the detected values of the grip sensors in steps S42, S54, S65, and S67.

Sixth Example

Next, one or more embodiments of a sixth example of the present invention will be described. A configuration of a manually propelled vehicle according to one or more embodiments of the present example may be similar to that of the manually propelled vehicle 1 in one or more embodiments of the first example described above.

In one or more embodiments of the present example, the processor 81 may start the assist control via the wheel drive controller 82 based on outputs of the grip sensor 71 and the distance measuring sensor 72 when the processor 81 determines that both the left hand grip sensor 71L and the right hand grip sensor 71R are being held, a force or pressure equal to or greater than the predetermined value may be applied to both the left hand grip sensor 71L and the right hand grip sensor 71R, and a measured distance is within the fixed range. Further, the assist control may not be initiated if conditions other than the conditions described above are detected.

Accordingly, the assist control can be initiated after confirming the state of normal use by the user and the assist control may not be initiated when the state of use may be abnormal. Therefore, it can avoid a dangerous condition.

In addition to the condition described above, the assist control may be initiated when the processor 81 determines that only one side of the left hand grip sensor 71L or the right hand grip sensor 71R is being held, a force or pressure equal to or greater than the predetermined value may be applied to the grip sensor that is being held, and a measured distance is within the fixed range.

One or more embodiments, for example, may use a configuration that further provides a grip sensor in the gripping positions of the left and right respectively in the handle of the configuration illustrated in FIG. 11 described above.

Various embodiments of the present invention have been described above; however, various modifications can be made without departing from the spirit of the present invention.

For example, a distance sensor need not be limited to just one, and may be provided in a plurality. In such case, for example, a plurality of distance measuring sensors may be provided so as to align in the height direction (vertical direction) of a manually propelled vehicle so that a condition such as squatting, falling, rising up, and the like, of a user can be detected.

According to one or more embodiments, a manually propelled vehicle may be a baby carriage, dolly, wheelchair, and the like. Although the disclosure has been described with respect to only a limited number of embodiments, those skilled in the art, having benefit of this disclosure, will appreciate that various other embodiments may be devised without departing from the scope of the present invention. Furthermore, those of ordinary skill in the art would appreciate that certain "units," "parts," "elements," or "portions" of one or more embodiments of the present invention may be implemented by a circuit, processor, etc. using known methods. Accordingly, the scope of the invention should be limited only by the attached claims

DESCRIPTION OF THE REFERENCE NUMERALS 1 manually propelled vehicle
20 grip
31 drive wheel
71 grip sensor
71L left hand grip sensor
71R right hand grip sensor
72 distance measuring sensor
80 controller
81 processor
82 wheel drive controller
91 wheel drive mechanism
120 handle
121 handlebar
122 middle handle
123 handle holder
124 neutral holding section
171 handle sensor
1711 first sensor
1712 second sensor
1713 third sensor
1714 fourth sensor
172 distance measuring sensor

What is claimed is:
1. A manually propelled vehicle, comprising:
a vehicle body;

a wheel for moving the vehicle body;
a force sensor that detects an operating force and outputs sensor data;
a distance measuring sensor that measures a distance between the manually propelled vehicle and a user and outputs sensor data; and
a controller comprising:
   a processor that receives the sensor data of the force sensor and the sensor data of the distance measuring sensor; and
   a wheel drive controller that controls driving and braking of the wheel based on an output of the processor, wherein
the processor determines a gait cycle of the user based on the sensor data of the force sensor and the sensor data of the distance measuring sensor, and
the wheel driver controls the driving and braking of the wheel based on the gait cycle.

2. The manually propelled vehicle according to claim 1, wherein the processor determines that an abnormal condition has occurred when the processor detects a deviation from a standard state of use based on at least one of the sensor data of the force sensor and the sensor data of the distance measuring sensor.

3. The manually propelled vehicle according to claim 2, wherein, when the processor detects the deviation from the standard state by determining that the measured distance by the distance measuring sensor exceeds a predetermined distance, the wheel drive controller brakes or stops the manually propelled vehicle.

4. The manually propelled vehicle according to claim 2, wherein the processor sets a standard state for each pattern of use without deviation by calculating statistics based on the sensor data of the force sensor and the sensor data of the distance measuring sensor.

5. The manually propelled vehicle according to claim 1, wherein the processor excludes data variation cycles that are shorter than a data variation cycle synchronized with the gait cycle.

6. The manually propelled vehicle according to claim 1, further comprising a grip to be held by the user and attached to the vehicle body, wherein
the force sensor comprises:
   a right hand grip sensor provided on a right hand of the grip and that detects pressure applied on the grip by a right hand of the user; and
   a left hand grip sensor provided on a left hand of the grip and that detects pressure applied on the grip by a left hand of the user, and
the sensor data of the force sensor comprises the pressure detected by the right hand grip sensor and the pressure detected by the left hand grip sensor.

7. The manually propelled vehicle according to claim 6, wherein
   when the processor determines that the grip is held by the user with one of either the right or the left hand, the processor determines whether the detected pressure of the one of the grip sensors is equal to or less than a predetermined value, whether the grip is pushed or pulled by the user based on the sensor data of the force sensor, and whether the measured distance by the distance measuring sensor tends to be short or long, and
   based on a determination result of the processor, the wheel drive controller controls the manually propelled vehicle to accelerate or decelerate and to move forward, backward, or turn.

8. The manually propelled vehicle according to claim 6, wherein
   the processor determines whether the grip is pushed or pulled by the user based on the sensor data of the force sensor, whether a difference in detected values between the left and the right grip sensors is equal to or less than a predetermined value, and whether the measured distance by the distance measuring sensor tends to be short or long, and
   based on a determination result of the processor, the wheel drive controller controls the manually propelled vehicle to accelerate or decelerate and to move forward, backward, or turn.

9. The manually propelled vehicle according to claim 6, wherein
   the processor initiates an assist control via the wheel drive controller when the processor determines, based on the sensor data of the force sensor and the sensor data of the distance measuring sensor, that both the left and the right grip sensors are being held, that the pressure applied to the left grip sensor and the pressure applied to the right grip sensor are both equal to or greater than a predetermined value, and that the measured distance is within a fixed range.

10. A method for controlling a manually propelled vehicle comprising a vehicle body and a wheel for moving the vehicle body, the method comprising:
   detecting an operating force and outputting sensor data based on the detecting;
   measuring a distance between the manually propelled vehicle and a user and outputting sensor data based on the measuring;
   controlling driving and braking of the wheel based on the sensor data of the detecting and the sensor data of the measuring;
   determining a gait cycle of the user based on the sensor data of the detecting and the sensor data of the measuring; and
   controlling the driving and braking of the wheel based on the gait cycle.

11. The method according to claim 10, further comprising:
   detecting a deviation from a standard state of use based on at least one of the sensor data of the detecting and the sensor data of the measuring; and
   determining that an abnormal condition has occurred when the deviation is detected.

12. The method according to claim 11, further comprising:
   detecting the deviation by determining that the measured distance between the manually propelled vehicle and the user exceeds a predetermined distance; and
   braking or stopping the manually propelled vehicle when the deviation is detected.

13. The method according to claim 11, further comprising:
   calculating statistics based on the sensor data of the detecting and the sensor data of the measuring; and
   setting a standard state for each pattern of use without deviation based on the calculated statistics.

14. The method according to claim 10, further comprising excluding data variation cycles that are shorter than a data variation cycle synchronized with the gait cycle.

15. The method according to claim 10, wherein the manually propelled vehicle further comprises a grip to be held by the user and attached to the vehicle body, and the method further comprises:
   detecting pressure applied on the grip by a right hand of the user; and detecting pressure applied on the grip by a left hand of the user, wherein the sensor data of the detecting comprises the detected pressure applied by the right hand of the user and the detected pressure applied by the left hand of the user.

16. The method according to claim 15, further comprising:

determining that the grip is held by the user with one of either the right or the left hand;

determining whether the detected pressure applied by one of the right or the left hand is equal to or less than a predetermined value, whether the grip is pushed or pulled by the user based on the sensor data of the detecting, and whether the measured distance tends to be short or long, and based on the determining, controlling the manually propelled vehicle to accelerate or decelerate and to move forward, backward, or turn.

17. The manually propelled vehicle according to claim 15, further comprising:

determining whether the grip is pushed or pulled by the user based on the sensor data of the detecting, whether a difference between the detected pressure applied by the right hand and the detected pressure applied by the left hand is equal to or less than a predetermined value, and whether the measured distance tends to be short or long, and based on determining, controlling the manually propelled vehicle to accelerate or decelerate and to move forward, backward, or turn.

18. The manually propelled vehicle according to claim 15, wherein initiating an assist control when the determining determines that the pressure applied by the right hand and the pressure applied by the left hand are both equal to or greater than a predetermined value and that the measured distance is within a fixed range.

\* \* \* \* \*